July 4, 1950   B. E. O'CONNOR   2,514,140
COMBINATION LINEAR AND ROTARY VIBRATION DAMPER
Filed June 17, 1947

Inventor
BERNARD E. O'CONNOR by The Firm of Charles W. Hills   Attys.

Patented July 4, 1950

2,514,140

UNITED STATES PATENT OFFICE 2,514,140

COMBINATION LINEAR AND ROTARY VIBRATION DAMPER

Bernard E. O'Connor, Buffalo, N. Y., assignor to Houdaille-Hershey Corporation, Detroit, Mich., a corporation of Michigan Application June 17, 1947, Serial No. 755,180

3 Claims. (Cl. 188—1)

This invention relates to improvements in the damping of linear and rotary vibrations and more especially where such vibrations are liable to occur in the same mass.

Insofar as the applicant is advised, the problem of damping the vibrations in what may be termed a free mass, such as an aerodynamic surface, of which airplane wings or tail surfaces are examples, has heretofore defied successful solution. Conventional shock absorbers cannot be used with such a mass because there is nothing to serve as a base to which the shock absorber can be anchored. Moreover, such a free mass is subject not only to torsional vibrations, but also to linear vibrations. The damping of either of these modes of vibration does not necessarily stop the other mode of vibration.

Flutter in aerodynamic surface structures is a self-excited vibration due to the association of various categories of freedom, such as flexural and torsional, with the energy supplied by the airstream while an aircraft is in motion, and more especially while in flight. All aerodynamic surfaces may be referred to as unstable systems, because when displaced from equilibrium position their tendency is to flutter with ever-increasing amplitude. All aerodynamic surfaces become unstable above respective determinable speeds.

A principal object of the present invention is to provide for the damping of both linear and torsional modes of vibration, such as flutter in aerodynamic surfaces, in a simple, inexpensive and effective manner.

It is another object of the invention to provide a combinational torsional and linear vibration damper utilizing a free inertia mass.

A further object of the invention is to provide a new and improved vibration damper including a rotary and linearly movable vibration damping mass.

Still another object is to increase the stability of aerodynamic surfaces, and more particularly to enable such surfaces to be operated at greater air speeds.

Other objects, features and advantages of the present invention will be readily apparent from the following detailed description of a preferred embodiment thereof taken in conjunction with the accompanying drawings, wherein.

Figure 1:
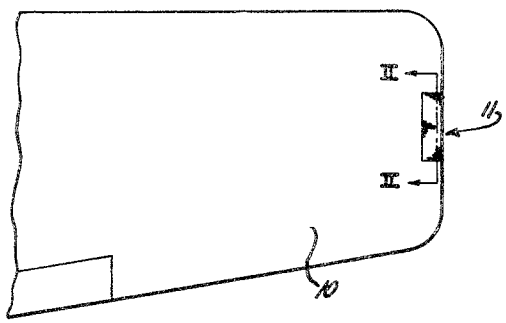
Figure 1 is a fragmentary more or less schematic plan view of an airplane wing incorporating the present invention.
Figure 2:
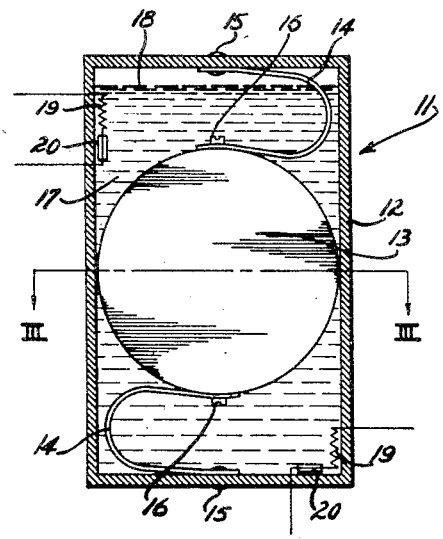
Figure 2 is an enlarged more or less schematic sectional view through the vibration damper shown in Figure 1 and taken substantially on the line II—II.
Figure 3:
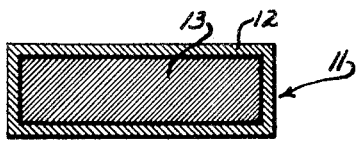
Figure 3 is a horizontal sectional view taken substantially on the line III—III of Figure 2.

As an example of a mass which is subject to both linear and torsional vibrations, an aerodynamic surface structure, such as an airplane wing 10, is shown in Figure 1. Both the wings and the tail surfaces of airplanes are subject to linear and torsional modes of vibration. The association of these two modes with the airstream as a source of energy will at certain speeds result in instability which manifests itself in the form of flutter. Many cases of structural failure have been attributed to flutter. This instability can be rendered substantially stable by coupling an auxiliary damping mass effective in both linear and torsional modes of vibration to the main mass through a viscous medium or through a viscous and a spring medium. Any means which will render stable otherwise unstable aerodynamic surfaces permits higher speeds for a given structure or lighter structures for a given speed and is therefore an important and valuable expedient.

According to the present invention, both linear and torsional vibrations are dampened through the medium of an inertia member which resists sudden deviations from a state of equilibrium or from a static condition with respect to its supporting structure. The inertia member is supported in a manner to be relatively movable or to permit movement relative thereto of the supporting structure.

In a representative embodiment, a damper unit 11 is provided which is adapted for use with the aerodynamic member or wing 10 and, as shown in Figure 1, is adapted to be applied to the wing at the locus of approximately maximum potential flutter, as at the tip and preferably on the torsional axis thereof.

The unit 11 comprises a casing 12 providing a chamber or housing for a weight or inertia member 13. The casing 12 may be of any preferred construction and the inertia member 13 may be made from any preferred material and in its simplest form comprises a metal disk of suitable diameter and thickness.

The relationship of the casing 12 and the inertia member 13 is such that they are relatively movable linearly and torsionally or rotatably. In the specific embodiment illustrated, substantial relative rotary movement is permitted and linear movement is substantially restrained to a path only in directly opposite directions for the reason that the unit 11 is especially adapted for use with an aerodynamic member. However, it will be understood that where desirable the chamber within the casing 12 may be so proportioned that the inertia member 13 will be free for relative linear movement in any or all directions.

In an airplane wing or similar aerodynamic surface, the linear vibrations are, of course, up and down. For this purpose, the casing 12 is so proportioned with respect to the diameter of the inertia member 13 that clearance is afforded for substantial relative vertical movement of casing and inertia member, but the inertia member is confined against substantial horizontal movement, this being primarily to conserve space. Accordingly, the vertical internal dimension of the casing 12 is such as to afford substantial clearance for vertical movement of the inertia member 13. The horizontal dimension on the diameter of the inertia member 13 is only slightly greater than the diameter of the inertia member.

Axially of the inertia member 13, the internal dimension of the casing 12 is only slightly greater than the thickness of the inertia member so as to afford a closely spaced relationship between the opposing side surfaces of the inertia member and the side walls of the chamber afforded by the casing 12.

Means are provided for supporting the inertia member 13 in a preferably vertically centered normal or equilibrium relation within the casing 12 but permitting relative vertical movement between the casing and inertia member. Herein such means comprises a pair of generally U-shaped leaf springs 14, each connected at one leg to the casing 12 as by means of a rivet 15 and to the weight 13 at the other leg as by means of a screw 16 in such a manner that the inertia member 13 is maintained in substantially uniform spaced relation to the upper and lower walls of the casing 12. For balanced support the springs 14 are preferably directed in respectively opposite directions.

The chamber provided by the interior of the casing 12 is substantially filled with a viscous fluid 17 such as silicone which will afford resistance to either linear or rotary motion of the inertia member 13 with respect to the housing 12. This resistance is caused by the shear resistance of the viscous film in the small clearances between the closely opposing surfaces of the casing and inertia member and particularly between the relatively broad opposing surfaces at the two sides of the inertia member 13 and the sides of the casing 12, and is proportional to the relative velocity between the inertia member 13 and the casing 12.

Through this arrangement, the inertia member 13 is adapted for relative vertical or rotary movement in the casing 12 as permitted by yielding of the springs 14 and resistance of the fluid friction. After any displacement, the springs 14 tend to equalize the position of the inertia member 13 within the chamber 12.

Since the spacing between the side faces of the inertia member 13 and the opposing walls of the casing 12 is quite close, the film of viscous fluid in the spaces affords substantial viscous shear film resistance to any relative movement of the casing and the inertia member. This resistance to relative movement is valuable in damping vibrations since it tends to hold the casing 12 against any quick movements either oscillatory or linear relative to the inertia member 13 which, due to the inertia of its mass, resists following such vibratory movements. As a result, vibrations in the mass with which the vibration damping unit is associated, such as the airplane wing 10, are effectively dampened. On the other hand, ordinary movements of the airplane wing or other mass to be dampened with which the damping unit 11 is associated are in no way interfered with. With an airplane wing or other aerodynamic surface this is of particular importance since interference with necessary maneuvers of the aerodynamic surface must be avoided.

For accommodating expansion of the viscous fluid 17, a suitable air space may be left in the top of the damper chamber 12, as indicated at 18.

In order to maintain the viscosity of the fluid 17 of substantially uniform viscosity in spite of great variations in external temperatures, and especially where very low temperatures may prevail as in high altitude flying, temperature regulating means may be provided in or for the damper unit 11. In a simple form such regulating means may comprise an electric heating element 19 and a thermostatic or like control 20. Preferably a separate temperature or viscosity regulator is provided for the virtually separate masses of fluid in both the upper and the lower sections of the unit 11.

It will, of course, be understood that various details may be varied through a wide range without departing from the principles of this invention, and it is, therefore, not the purpose to limit the patent granted hereon otherwise than necessitated by the scope of the appended claims.

I claim as my invention:

1. In combination in a vibration damper of the character described, a circular flat inertia mass and means for movably supporting the inertia mass including an enclosure defining a chamber having spaced straight parallel walls in closely spaced relation to the sides of the inertia mass and other spaced straight parallel walls normal to said first mentioned walls and disposed in close relation to diametrically opposite portions of the periphery of the inertia mass, additional walls of the enclosure chamber being substantially spaced from the periphery of the inertia mass of 90° from a line joining said diametrically opposite portions, and viscous fluid in the chamber restrained in displacement from one part of the chamber to the other part by the close spacing between said sides and said opposite peripheral portions of the inertia mass and the respective chamber walls disposed in opposition thereto.

2. In combination in a vibration damper of the character described, a circular flat inertia mass and means for movably supporting the inertia mass including an enclosure defining a chamber having spaced straight parallel walls in closely spaced relation to the sides of the inertia mass and other spaced straight parallel walls normal to said first mentioned walls and disposed in close relation to diametrically opposite portions of the periphery of the inertia mass, additional walls of the enclosure chamber being substantially spaced from the periphery of the inertia mass 90° from a line adjoining said diametrically opposite portions, viscous fluid in the chamber restrained in displacement from one part of the chamber to the other part by the close spacing between said sides and said opposite peripheral portions of the inertia mass and the respective chamber walls disposed in opposition thereto, and respective generally U-shape spring members normally maintaining the inertia mass in substantially center relation between said additional walls of the chamber, said spring members each having one leg secured to the adjacent periphery of the inertia mass and the remaining leg secured to the enclosure and with the mouths of the spring U's opening in respective opposite directions.

3. In combination in a vibration damper, means defining a closed chamber, a circular inertia mass within said chamber, the circular inertia mass having opposing flat sides and the chamber being defined by flat surfaces in closely spaced relation to the sides of the inertia mass, opposite peripheral portions of the inertia mass being substantially spaced from opposing walls of the chamber, the chamber having additional opposed straight parallel walls in closely spaced relation to diametrically opposite portions of the periphery of the inertia mass disposed 90° from the first mentioned peripheral portions, means yieldably supporting the inertia mass in peripherally spaced relation to both of said first mentioned walls of the chamber, and a viscous fluid in the chamber providing films having shear resistance to relative parallel movement between said flat sides and said flat surfaces for resisting linear and relative rotary movements of the inertia mass within the chamber, and also providing a body of fluid in each of the substantial spaces between the inertia mass and said first mentioned chamber walls.

BERNARD E. O'CONNOR.

REFERENCES CITED

The following references are of record in the file of this patent:

UNITED STATES PATENTS

| Number | Name | Date |
|---|---|---|
| 989,958 | Frahm | Apr. 18, 1911 |
| 1,766,995 | Hofmann | June 24, 1930 |
| 2,038,603 | Roche | Apr. 28, 1936 |
| 2,139,817 | Gogan | Dec. 13, 1938 |
| 2,180,893 | Best | Nov. 21, 1939 |
| 2,271,976 | Hasbrouck, Jr., et al. | Feb. 3, 1942 |

FOREIGN PATENTS

| Number | Country | Date |
|---|---|---|
| 337,466 | Great Britain | Nov. 3, 1930 |
| 508,513 | Great Britain | July 3, 1939 |
| 515,318 | Great Britain | Dec. 1, 1939 |
| 518,291 | Great Britain | Feb. 22, 1940 |
| 726,544 | France | Mar. 7, 1932 |